United States Patent

[11] 3,557,648

[72] Inventors Arthur G. Coffin;
      Bruce W. Stockbridge, Kingsport, Tenn.
[21] Appl. No. 794,089
[22] Filed Jan. 27, 1969
[45] Patented Jan. 26, 1971
[73] Assignee Eastman Kodak Company
      Rochester, N.Y.
      a corporation of New Jersey

[54] METHOD AND APPARATUS FOR CUTTING ELONGATED MATERIAL INTO PREDETERMINED SHORTER LENGTHS
20 Claims, 4 Drawing Figs.

[52] U.S. Cl. .................................................. 83/18,
      83/20, 83/175, 83/176, 83/431, 83/439, 83/566, 83/913
[51] Int. Cl. .................................................. B26d 1/12
[50] Field of Search .......................................... 83/18—20,
      175, 176, 403, 431, 439, 511, 566, 913

[56] References Cited
UNITED STATES PATENTS
3,062,082  11/1962  Keith ........................... 83/913X
3,303,733  2/1967  Medlycott et al. ............. 83/913X
3,485,120  12/1969  Keith ........................... 83/913X Primary Examiner—William S. Lawson
Attorneys—William T. French and Malcolm G. Dunn ABSTRACT: Method and apparatus by which elongated material is wound around a stationary cutter assembly to position the material into contact with and across all of the spaced cutting edges without movement thereafter of the contacting layer longitudinally of the material relative to the cutting edges. Other layers of the material are wound around the cutter assembly outwardly of the contacting layer and a force applying device moves in a path around the cutter assembly and presses against the outer material layers which in turn urge the contacting layer of material inwardly of the cutting edges thereby severing the contacting layer into predetermined shorter lengths. Tension can be applied to the outer layers as they are wound around the cutter assembly to urge the contacting layer inwardly of the cutting edges of the cutter assembly and thus sever the contacting layers into the shorter lengths.

ARTHUR G. COFFIN
BRUCE W. STOCKBRIDGE
INVENTORS

PATENTED JAN 26 1971

ARTHUR G. COFFIN
BRUCE W. STOCKBRIDGE
*INVENTORS*

BY

*Malcolm F. Dunn*
ATTORNEY

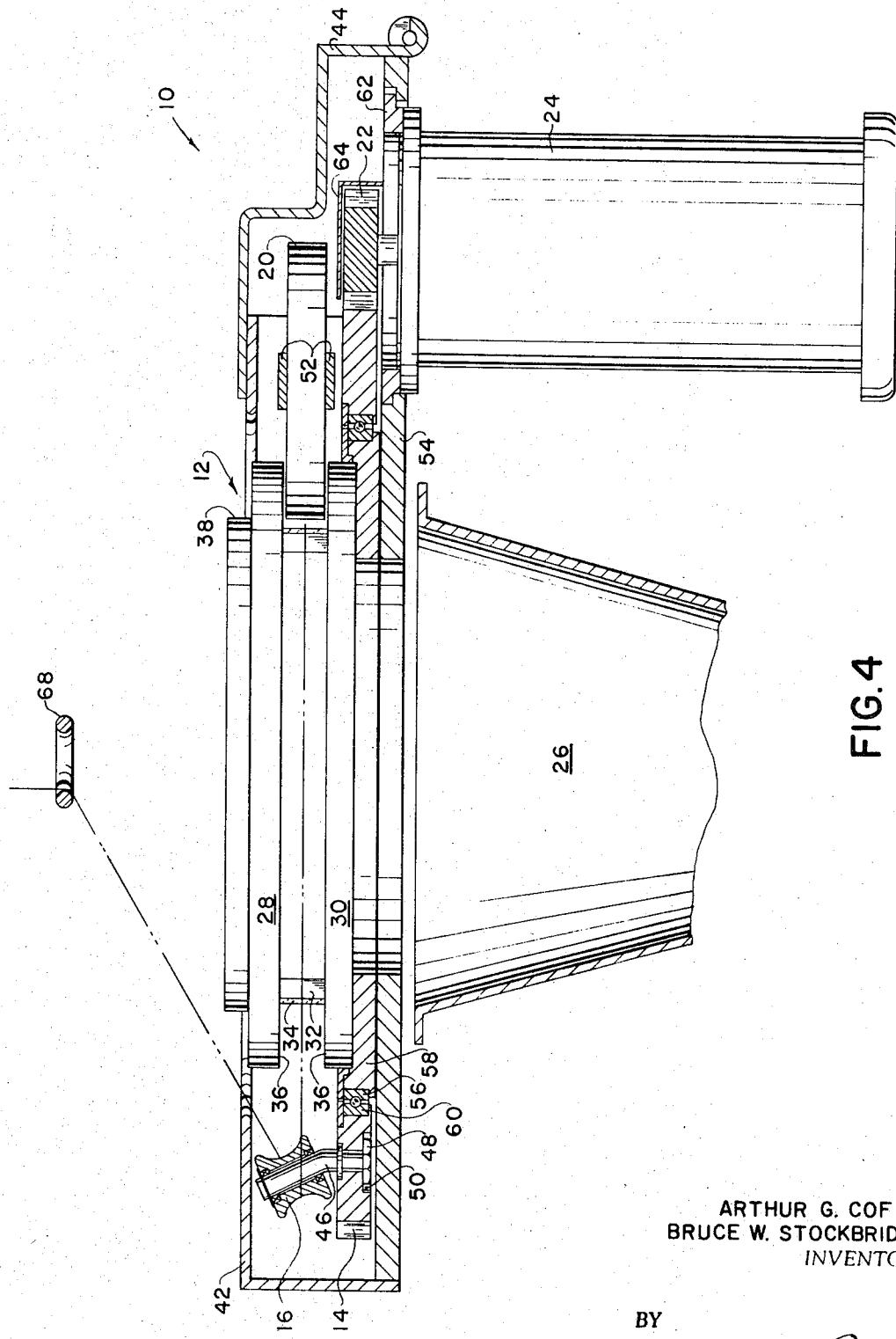

METHOD AND APPARATUS FOR CUTTING ELONGATED MATERIAL INTO PREDETERMINED SHORTER LENGTHS

BACKGROUND OF THE INVENTION

The invention relates to a method and apparatus for cutting elongated material into predetermined shorter lengths, such as cutting continuous filamentary material or tow into fibers of predetermined dimensions.

When polyester or other synthetic fiber tow is cut, longitudinal movement of the fiber tow relative to the knife edges dulls the knife edges and causes friction which generates higher than usual amounts of heat, the heat often being sufficient to fuse the ends of adjacent fibers together. Such rapid blade dulling results in frequent shutdown times for machine maintenance involved in changing blades.

Such problems are avoided by an apparatus and method in which the elongated material is wrapped around a reellike member formed by a plurality of cutting blades spaced apart a distance substantially equal to the lengths to be cut. The cutting edges of the blades form a circular or other closed pattern around and extend radially outward from the axis of the reellike members so that as the elongated material is fed thereon under slight tension, the material is wrapped in touch contact with the cutting edges. As wrapping progresses, the wrap has its innermost strands of filaments forced into severing contact sequentially with the blade edges, preferably by a pressure applying device such as by a roller that is mounted adjacent the reellike member.

Besides avoiding the problems of blade dulling, other significant advantages of the above-described method and apparatus include its ability to cut staple fibers of uniform length and having square sheared ends. The latter is in contrast to the slanting or pointed shear produced by many fiber cutters of the prior art which cause swirls in the yarn and undesirable "neps" in the woven cloth.

Another advantage obtained by the above-described method and apparatus when a nonrotary, reellike member is employed is that roping or tangling of the cut fibers is avoided. This is a problem mainly in cutting long fibers, e.g., of greater than 2 inch staple length. When a rotating reellike member is used, the cut fibers are subjected to an angular velocity which can result in a ropelike or tangled aggregation of the long staple fibers. These then clog the exit of the cutter assembly and necessitate periodic shutdown of the apparatus.

The present invention thus provides a valuable method and apparatus by means of which the various advantages of the above-described cutting apparatus and method, particularly by means of which the advantages of the use of a nonrotating, reellike member, can be obtained.

SUMMARY OF THE INVENTION

Accordingly, an object of the present invention is to provide a method and apparatus for practice of the method that will result in the described advantages as well as inherent advantages.

Other objects of the invention will become apparent to those skilled in the art to which this invention appertains from the drawings and the description that is set forth herein.

The invention therefore is directed to a method and an apparatus for practice of the method where, in one form of the invention, elongated material is caused to be wound around a stationary cutter assembly in such manner as to position a layer of the material into contact with and across all of the spaced cutting edges of the knife blades without movement thereafter of the contacting layer longitudinally of the material relative to the cutting edges, to wind other layers of the material around the assembly outwardly of the contacting layer and to move a force applying device in a path around the cutter assembly, which device spool guide is mounted, and the cutter assembly around which the tow is against the outer layers which in turn urge the contacting layer inwardly of the cutting edges to sever the contacting layer into predetermined shorter lengths. In another form of the invention tension can be applied to the outer layers as they are wound around the cutter assembly thereby urging the contacting layer inwardly of the cutting edges of the cutter assembly and thus sever the contacting layer into the shorter lengths.

BRIEF DESCRIPTION OF THE DRAWINGS

FIG. 4 is a cross-sectional view taken along line 4—4 of FIG. 1 with the path followed by the elongated material represented in phantom line.

DESCRIPTION

Figure 1:
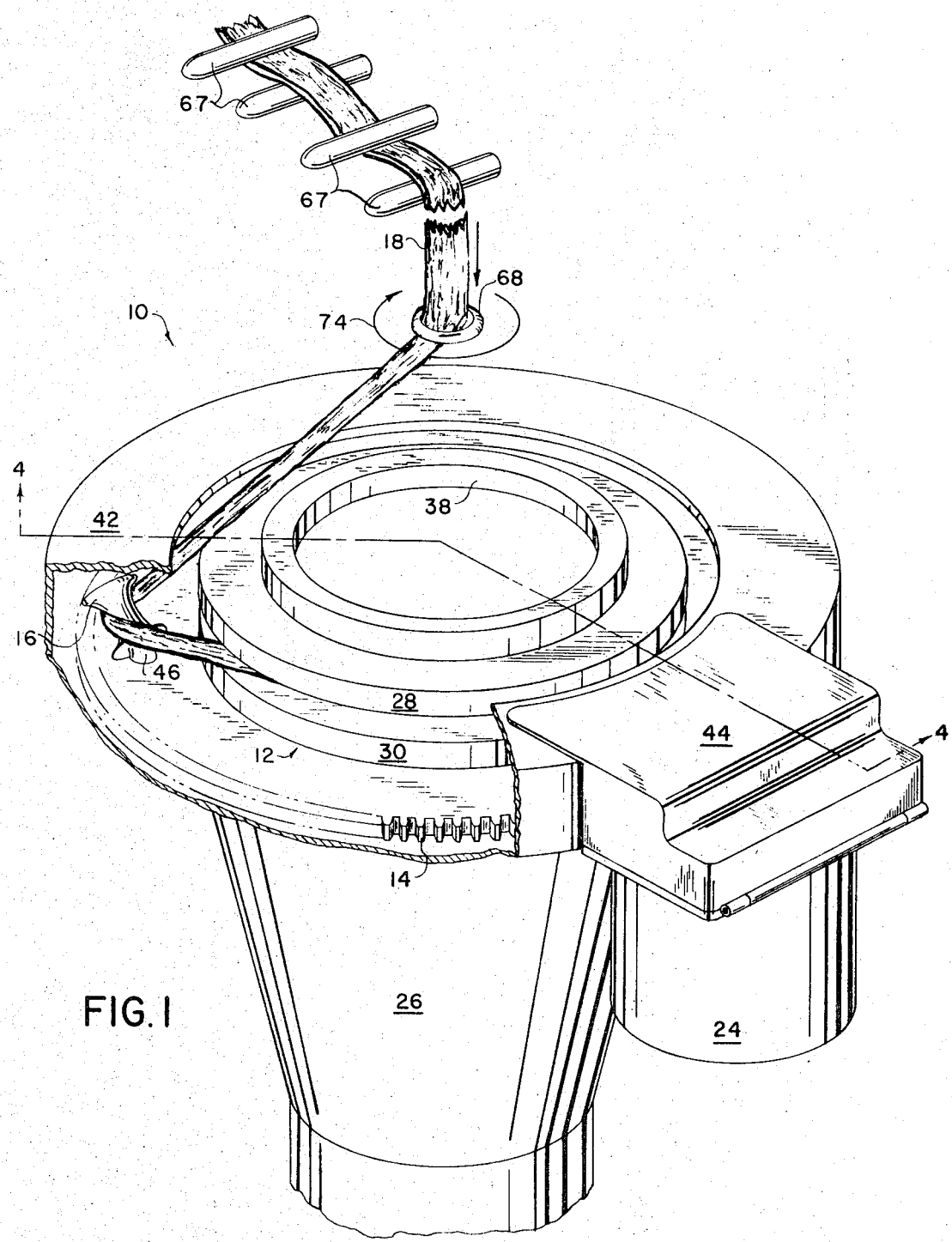
FIG. 1 is a fragmentary perspective view of the apparatus with portions of the apparatus cut away to illustrate the guiding of the elongated material or filamentary tow to the spool guide, the ring gear on which the spool guide is mounted, and the cutter assembly around which the tow is wound by the rotational movement of the ring gear and the spool guide.

With reference to the drawings, the apparatus 10 has a cutter assembly 12, a ring gear 14 that is rotatable in a path around the cutter assembly, a spool guide 16 for guiding the filamentary tow or elongated material 18 into position around the cutter assembly as the ring gear on which the spool guide is supported moves, a pressure roller 20 also supported on the ring gear, a gear pinion 22 for drivingly engaging the ring gear, and a motor 24 for driving the gear pinion.

The apparatus may be suitably secured in upright position on the floor, and the truncated cone-shaped housing 26 illustrated in FIGS. 1 and 4 serves as a discharge chamber for the severed lengths of material from the interior of the cutter assembly.

While it is preferred that the cutter assembly be positioned so that its axis lies in a vertical plane and the elongated material is horizontally wound around the cutter assembly, it will be appreciated that any other desired orientation can be utilized with the only difference being in the manner in which the cut fibers or other materials are removed from the cutter assembly. For instance, the cutter assembly can be arranged so as to have a horizontal axis with the cut fibers being removed from the interior by an exhaust system disposed centrally of the cutter assembly.

The cutter assembly 12 includes a mounting member, preferably circular in configuration, comprising a pair of spaced discs 28, 30 which may be horizontally disposed and serve to support therebetween a plurality of knife blades 32 circumferentially spaced a predetermined distance apart from each other around the cutter assembly and thus in the aggregate presenting an endless profile. The discs are suitably secured together in spaced, parallel relationship (by structure not shown); or when the material to be cut is not excessively heavy, the knife blades as clamped between the discs can be the sole structural tie between the discs. The knife blades 32 are illustrated as being vertically disposed relative to the horizontally disposed discs and their cutting edges 34 (FIG. 4) face outwardly of the mounting member. The positioning of the blades relative to the discs is such as to leave a flangelike area 36 (FIG. 4) outwardly of the cutting edges which together with the cutting edges form an annular chamber within which the elongated material is wrappingly received around the cutter assembly.

A guard ring 38 positioned on top of disc 28 is suitably secured to the disc and may be removed for changing blades. The discs 28, 30 define an opening 40 (FIG. 2) into which the severed fibers are initially moved for subsequent removal through the discharge chamber of the housing 26 as by gravity fall.

A cover 42 (FIGS. 1 and 4) serves to protect personnel from coming into contact with the moving ring gear. The motor 24 is suitably secured to structure of the apparatus to be described and is provided with a hinged cover 44 for a purpose to be described.

In reference now to the ring gear 14 and the guide spool 16 and pressure roller 20 that are movable with the ring gear, the guide spool is mounted on a shaft 46 that is inclined approximately 30° from the perpendicular at its upper end portion. The shaft may be adjustably rotated by loosening the nut 48 (FIG. 4) in the recess 50 on the underside of the ring gear 14 so as to position the spool for proper guiding of the tow onto and around the cutter assembly, such adjustment thus altering the angle of the entry and release of the tow relative to the spool guide. The spool guide is rotatable upon its own axis by the engaging movement of the tow as it is guided to the cutter assembly.

The tow guide spool can be replaced by other suitable means such as by the use of an eyebolt secured to the ring gear and through which the tow would pass into encirclement of the cutter assembly. It will be appreciated, however, that the frictional effect on the tow would more likely be increased over that resulting from the use of the tow guide spool.

The pressure roller 20 is adjustably supported for free rotation relative about its axis by a cantilever construction such as by a pair of levers 52, which are in turn fixed to a worm gear 53. The worm gear is rotated by worm 55, the latter being supported for adjustable rotation by suitable mounting structure such as bracket 57 secured to the ring gear. The operator may move the pressure roller relative to the cutting edges of the knife blades by turning the worm in any suitable manner.

In reference to FIG. 4, the cutter assembly 12 is secured to a support frame 54 (which may be suitably secured to the floor of a building or the like). This may hold the cutter assembly stationary (as shown) or it may provide for rotation of the cutter assembly for a mode of operation in which both the cutter assembly and the ring gear (guiding member) rotate. In such case the rates and directions of the rotation must be such as to provide wrapping of the fiber onto the knife edges 34. The support frame also serves to support the fixed inner ball bearing race 56 and the mounting ring 58. The outer ball bearing race 60 may be pressed into the ring gear 14. The motor 24 is secured to a motor mounting plate 62 which is disposed within the support frame. A protective guard cover 64 is disposed over the gear pinion 22 to protect the operator from coming into contact with the gear pinion when the operator opens cover 44 to initially connect the tow end to the cutter assembly in a suitable manner.

Figure 2:
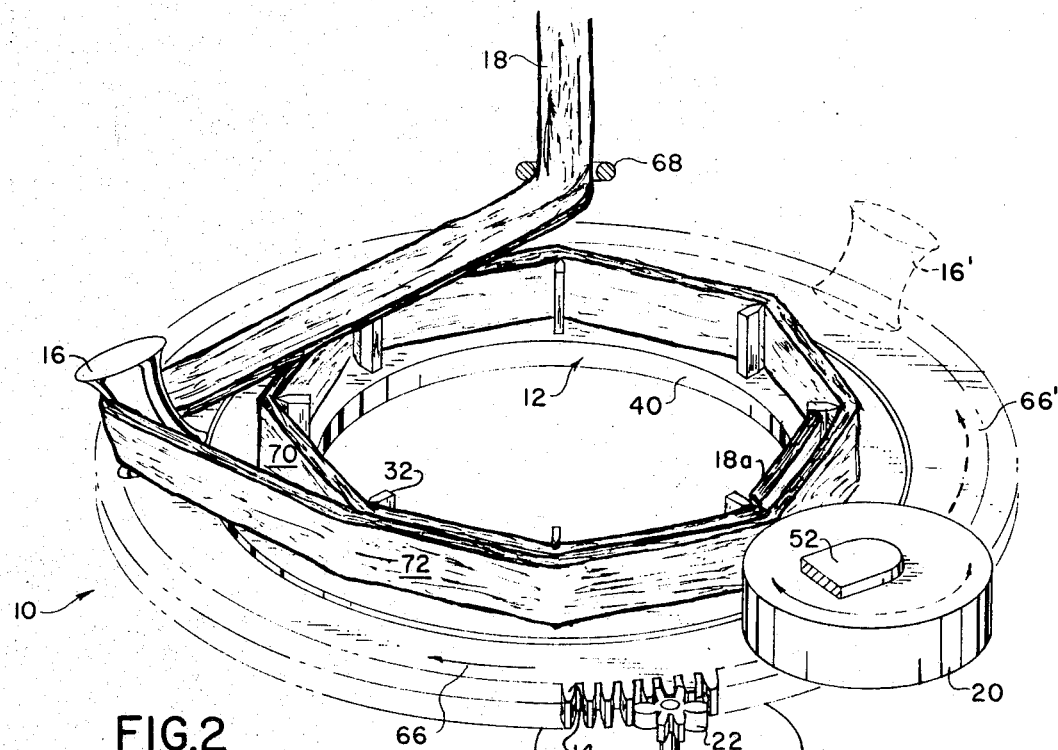
FIG. 2 is another fragmentary perspective view of the apparatus with other portions of the apparatus removed to illustrate the positioning of the layers of material around the cutter assembly with the contacting layer in contact with the cutting edges and the other layers outwardly of the contacting layer, the pressure roller mounted on the ring gear as well as the spool guide being mounted thereon, and the pinion drive of the motor in driving engagement with the ring gear.

In reference to FIG. 2, the rotation of the ring gear is shown by the arrow 66 in solid lines. If it is desired to rotate the ring gear in the opposite direction, as shown by arrow 66' in dotted lines, such as for promoting longer wear of the gear teeth on the ring gear, the spool guide 16 may be shifted to the position illustrated in dotted lines at 16'.

In operation of the apparatus, the elongated material or tow 18 is fed to the apparatus 10 through finger guides 67 suitably mounted separately from the apparatus and a ring guide 68, which is suitably fixably secured in center position above the cutter assembly, and around the spool guide 16 on the ring gear 14 to the cutter assembly.

The finger guides 67 shape the incoming filamentary tow 18 into a flattened tape or band which passes through the ring guide 68. The finger guides further serve the function of acting as a friction brake to place the tow under a controlled amount of tension as the tow is fed to the cutter assembly 12. The end of the elongated material or tow is initially secured by the operator to the cutter assembly in any suitable manner such as by tucking the tow between two adjacent blades, wrapping the tow around the blade assembly one full revolution and then tucking it under itself or by securing an end of the tow to one of the discs 28, 30.

Thus as the ring gear is rotated, the tow is positioned in touch, lightly tensioned contact with and across all of the cutting edges 34 of the knife blades 32 around the cutter assembly to form what may be called a "contacting layer" 70 (FIG. 2). As the ring gear continues to rotate, the spool guide serves to guidingly pull the material into a coil to form successive layers 72 (FIG. 2) outwardly of the contacting layer, the guide moving in a path equidistant from the endless profile presented by the cutting edges of the knife blades. The number of layers that are formed is usually determined by the positioning of the pressure roller 20 relative to the knife blades. Adjustment of the pressure roller determines the spacing between the blades and the radial surface of the roller, which in turn controls the number of layers of tow formed before pressure builds up within the aforedescribed chamber, as defined by flange area 36, cutting edges 34 and the pressure roller 20. The pressure continues to mount in magnitude until some of the filaments are forced to escape the pressure chamber at the location where the highest unit pressure exists between the chamber confines and the layers of filamentary tow.

As the ring gear rotates, the layers of material are successively added by the spool guide and the contacting layer 70 is cut or severed into shorter lengths 18a (FIGS. 2 and 3) when the pressure roller is brought by the ring gear radially opposite the knife blades. Thus the outer layers 72 are forced against the contacting layer 70 so that the contacting layer, while being retained in extended manner, is urged inwardly of the cutting edges 34 of the knife blades and thus severed. As each of the outer layers is caused to move inwardly to become the contacting layer, the severed shorter lengths are urged inwardly for subsequent gravity discharge into the interior of the cutter assembly through opening 40 and into the discharge chamber of the housing 26. The discharge of the cut lengths 18a of material into the interior is thus accomplished without entanglement and "roping," which is otherwise often the result of a rotating cutter assembly as heretofore mentioned when cutting longer lengths of staple such as greater than 2 inches in length.

A significant feature of the invention not heretofore discussed is that a slight twist is imparted to the tow, as illustrated by the arrow 74 in FIG. 1. This twist is dependent upon the diameter of the mounting member and for instance may be about one turn in 6 feet (thus difficult to illustrate in the drawings other than by the representation of a twist by arrow 74) for about a 2 foot diameter mounting member. The twist serves to form a bundle of the tow thereby keeping it centered on the cutting edges and reducing the pressure on the flange area 36 of the discs 28, 30. The bundle also serves to prevent filaments of the tow from becoming entrapped at the intersections of the knife blades with the discs 28, 30.

As previously mentioned above, the cutting edges are preferably spaced at equal radial distances from the axis of the cutter assembly so that the contacting layer will be completely divided into a number of lengths; but the distance between the cutting edges can also be staggered so that the blades form some closed geometrical figure or profile other than a circle with the result that a particular layer will be severed into a plurality of lengths during one rotation of the pressure roller around the cutter assembly with these lengths being themselves divided into a plurality of lengths during subsequent pressure roller rotations about the cutter assembly. Also, a conveyor mechanism could be used in place of the ring gear and adapted to move in a path equidistant to whatever closed geometrical figure is formed, the conveyor mechanism carrying the spool guide and the pressure roller in such path movement. Still further, the gear teeth could be replaced with a V-groove for cooperation with a belt drive.

The present invention is capable of cutting uniform lengths. The length of the tow cut depends on the outside lengths of the material or tow wrapped around the cutter assembly and the number of blades disposed on the cutter assembly.

The apparatus of the present invention is capable of cutting filamentary tow having 3 times the total denier of cutters commonly available on the market and having a comparable blade size and or a comparable price range. For instance, in one application of the present invention, it is capable of cutting at least 1½ million denier.

The length of staple cut on the apparatus of the present invention is dependent essentially on the outside diameter of the tow wrapped around the cutter assembly 12 and the number of blades disposed around the cutter assembly. The amount of tension under which the filaments are fed to the cutter assembly is a minor factor in determining staple length when crimped filaments are being severed. All that is required for proper operation is sufficient tension to temporarily lessen the crimp in the filaments which is relatively small because of inherent flexibility of textile materials. As for the upper limit of tension which can be applied, it should not be so great as to change the character of the filaments as by permanently removing the crimp, reducing denier by stretching, and the like. It may be said, therefore, that the magnitude of tension on the tow as it is fed to the cutter assembly can be varied without appreciably affecting staple length.

It should be apparent that if the knife blades 32 should always be disposed on a cutter assembly having the same diameter an increase in the number of blades will result in more narrow spaces therebetween and shorter staple length, and conversely a decrease in the number of knife blades used will result in wider spaces therebetween and hence a longer staple length. A product having staple fibers of various lengths in predetermined ratios can be produced by merely manipulating the position of the knife blades to provide some knife blades which are widely spaced and some which are closely spaced.

Figure 3:
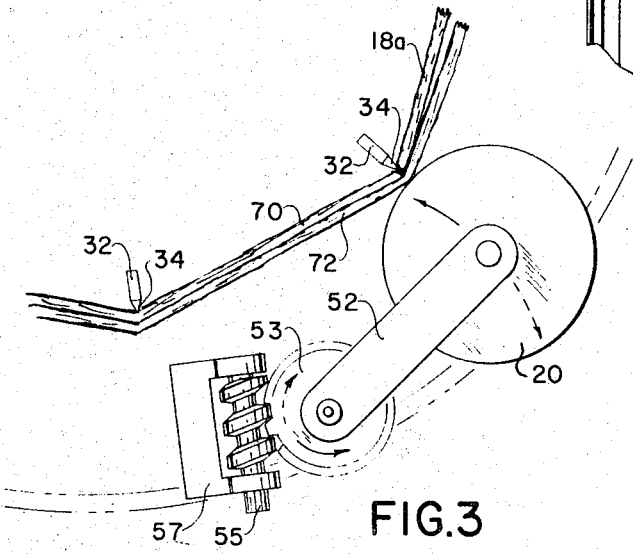
FIG. 3 is a plan view of a portion of the apparatus with the outer cover removed to illustrate the pressure roller and one manner by which it may be adjusted relative to the layers of material being wrapped around the cutter assembly.

The effect on staple length produced by varying the outside diameter of the filamentary tow pack in accordance with the invention is explainable in the following manner: The outermost layer is the layer closest to the tension that results from finger guides 67, ring guide 68 and spool guide 16 and is, therefore, under the greatest tension. The crimp in the fibers of the outer layer is, therefore, more thoroughly decreased. In the layers of the filamentary tow closest to the cutting edges, the tension is relieved somewhat because these layers, while having a total length equal to that of the outer layer, have been forced into spirals of smaller and smaller circumferences by the pressure roller acting on the outermost layer. By way of illustration the filamentary tow 18 is under maximum tension in the outer wrap 72 as illustrated in FIG. 3 and under substantially zero tension at 70 in the pressure chamber as previously defined. Therefore, the fibers in the outermost layer are substantially devoid, temporarily, or crimp while the fibers actually in the pressure chamber have recovered to the extent intended in the finished fiber. It should be understood that the tow length in the innermost wrap or contacting layer is the same total length as that of the outermost wrap or layer but differs therefrom in that it has regained its original crimp completely while the tensioned filaments of the outermost layer are substantially devoid of crimp. It is seen therefore that the length of the tensioned outermost wrap or layer determines the total length of all wraps and therefore the length of material to be processed during one revolution of the spool guide 16 and ring gear 14.

Assuming constant crimp per unit length and sufficient tension to temporarily lessen crimp cut staple length can then be determined by the formula:

$$\frac{\text{Outside Diameter of Winding} \times \pi}{\text{Number of Equally Spaced Blades}} = \text{Cut length}$$

Since, as shown above, the outside diameter of the tow wrap is a factor in fiber length or staple length, control of this dimension in used in accordance with our invention to vary such length. This control is accomplished by increasing or decreasing the space between cutting edge 34 of the knife blades 32 and the pressure roller 20. As described above, pressure roller 20 may be moved mechanically through rotation of the worm 55. Thus, the outside diameter of the tow pack on the cutter assembly 12 may be varied, and hence, the staple length can be adjusted. Moving roller 20 away from cutter assembly 12 increases wrap diameter and thus staple length while movement of the roller toward the cutter assembly effects a decrease in wrap diameter and staple length. Of course, the basic staple length is determined by the spacing of the knife blades 32, and the adjustment to be effected by movement of the pressure roller 20 produces changes on the order of several thousandths of an inch, with the variation being greater with the longer staple lengths. It should be apparent that the above discussion and explanation is applicable to the continuous materials heretofore indicated as well as other filamentary materials.

Although the invention has been described in considerable detail with reference to certain preferred embodiments thereof, it will be understood that variations and modifications can be effected without departing from the spirit and scope of the invention as described hereinabove and as defined in the appended claims.

We claim:

1. Apparatus for cutting elongated material into predetermined shorter lengths and comprising:
   a. a cutter assembly including a mounting member, and a plurality of knives secured to the mounting member and spaced apart a predetermined distance, the cutting edges of the knives facing outwardly of the mounting member; and
   b. means adapted
      1. to continuously move in a predetermined path around the mounting member;
      2. to guidingly position the elongated material into contact across all of the cutting edges around the mounting member in a manner so that no relative movement occurs between the thus-formed contacting layer of the elongated material and the cutting edges longitudinally of the elongated material;
      3. to continuously wrap elongated material in successive layers around and outwardly of the contacting layer; and
      4. to cause layers outwardly of the contacting layer to force each successively formed contacting layer inwardly of the cutting edges thereby severing the contacting layer of material into the predetermined shorter lengths.

2. Apparatus for cutting elongated material as defined in claim 1, and wherein said means includes a driven member adapted to move in said predetermined path and a guide member mounted on the driven member and adapted to engage and guide the elongated material into position around the mounting member as the driven member moves in said path.

3. Apparatus for cutting elongated material as defined in claim 1, and wherein said means includes a driven member adapted to move in said predetermined path and a pressure member mounted on the driven member and adapted to engage and to apply force against the outer layers of material thereby resulting in a sequential cutting of the contacting layer into said predetermined lengths as the driven member moves in said path.

4. Apparatus for cutting elongated material as defined in claim 2, and wherein said means further includes a pressure member mounted on the driven member and adapted to engage and to apply force against the outer layers of material thereby resulting in a sequential cutting of the contacting layer into said predetermined lengths as the driven member moves in said path.

5. Apparatus for cutting elongated material as defined in claim 1, and wherein the mounting member is circular in configuration and said means includes a ring gear that moves in said predetermined path around the circular mounting member.

6. Apparatus for cutting elongated material as defined in claim 5, and wherein said means further includes a rotatable guide mounted on said ring gear and adapted to engage and guide the elongated material into position around the mounting member as the ring gear moves in said path.

7. Apparatus for cutting elongated material as defined in claim 5, and wherein said means further includes a rotatable pressure roller mounted on said ring gear and adapted to engage and to apply force against the outer layers of material thereby resulting in a sequential cutting of the contacting layer into said predetermined lengths as the ring gear moves in said path.

8. Apparatus for cutting elongated material as defined in claim 6, and wherein said means further includes a rotatable pressure roller mounted on said ring gear and adapted to engage and to apply force against the outer layers of material thereby resulting in a sequential cutting of the contacting layer into said predetermined lengths as the ring gear moves in said path.

9. Apparatus for cutting elongated material as defined in claim 1, and wherein the mounting member comprises a pair of spaced discs that are horizontally disposed and between which the plurality of knives are supported in a manner vertical to the discs and thereby forming a reel with the cutting edges facing outwardly of the discs around the periphery, the discs extending radially outwardly of the cutting edges to define with the cutting edges an open ended annular chamber in which the elongated material is received and confined.

10. Apparatus for cutting elongated material as defined in claim 9, and wherein the discs define an axial opening into which the severed predetermined shorter lengths of material pass from said annular chamber as other contacting layers are severed thus urging previously severed shorter lengths radially inwardly.

11. An apparatus for cutting running elongated material into predetermined lengths and comprising:
   a. a cutter assembly having a plurality of cutting edges each edge facing outwardly of the assembly;
   b. means separate from said cutter assembly and adapted to move and continuously wrap the elongated material in layers around said cutter assembly positioning the innermost layer in touch contact with the plurality of cutting edges; and
   c. means forcing the inner layer of elongated material inwardly of the cutting edges thereby cutting the elongated material into said predetermined lengths.

12. An apparatus for cutting running elongated material into predetermined lengths and comprising:
   a. a knife assembly having a plurality of spaced cutting edges positioned in the aggregate to form an endless profile with each edges facing outwardly;
   b. guide means located outwardly of the cutting edge profile and adapted to move in a path equidistant to the profile and to guide said running elongated material as a layer into touch contact with each of the cutting edges and to form layers successively and radially outwardly of the layer in contact with the cutting edges;
   c. pressure means located outwardly of the cutting edge profile and also adapted to move in said equidistant path and to bear against the layers outwardly of said layer in contact and thereby force the latter layer inwardly of the cutting edges and thus cut the elongated material into said predetermined lengths; and
   d. means for moving said guide means and said pressure means in said equidistant path.

13. A method for cutting filamentary material into a number of lengths of controlled dimensions comprising the steps of:
   a. spirally winding said filamentary material into a coil having a plurality of concentric layers the innermost of which is placed in contact with a plurality of spaced knife edges;
   b. maintaining contact between said innermost layer and said knife edges with no relative movement therebetween longitudinally of said filamentary material by applying tension to said material as it is wound thereby forming said layers into a pack;
   c. applying a force on the outermost layer of said material at a location which is relative to the axis of the coil, said force being directed toward said axis thereby causing said innermost layer to move at an angle substantially perpendicular to its longitudinal axis thereby forcing said innermost layer past said knife edges and severing said filamentary material into lengths of controlled dimensions; and
   d. moving the application of said force around the outermost layer of said material.

14. A method for cutting elongated material into a number of shorter lengths comprising the steps of:
   a. continuously pulling elongated material into a coil with incoming successive layers being formed radially outwardly of the coil;
   b. continuously applying a radially directed force against the outer said successive layers and continuously moving the application of said force around the outer said successive layers; and
   c. continuously cutting the inner layer of the elongated material into said number of shorter lengths at a location that is radially inwardly from said radially directed force.

15. A method for cutting running elongated material characterized in that the material to be cut is brought into contact with a plurality of cutting edges that are stationary and the material is wound continuously in a closed path relative to the stationary cutting edges to form several superposing layers located in the same plane and each layer is moved inwardly of itself in the same plane and is cut upon occupying an innermost layer position, and whereas a layer in a superposed layer position serves as a cutting cushion.

16. A method for cutting elongated material into a number of shorter lengths comprising the steps of:
   a. continuously feeding the elongated material to a plurality of knife edges and extending the inner layer of the material across and in contact with each two adjacent knife edges so that the inner layer is in touch, lightly tensioned contact with the knife edges;
   b. applying a pressure against the material that is radially outwardly of the inner layer thereby forcing said inner layer against said knife edges and while retaining the inner layer in extended manner across said adjacent knife edges without relative movement longitudinally of the material relative to the knife edges cutting said inner layer into said number of shorter lengths; and
   c. continuously changing the location of the application of said pressure against the material that is outwardly of the inner layer so as to cut said inner layer at the changed location of said pressure.

17. A method for cutting elongated material into a number of shorter lengths comprising the steps of:
   a. continuously feeding elongated material to a cutter assembly;
   b. winding the material into a coil of concentric layers having radially inner and outer successive layer positions around the cutter assembly, the step of winding including the step of twisting the material as it becomes a layer of the coil;
   c. cutting the inner layer of the material into said shorter lengths; and
   d. moving an outer successive layer into an inner layer position.

18. A method for cutting elongated material into a number of shorter lengths comprising the steps of:
   a. continuously guiding the elongated material onto and around a plurality of stationary cutting edges and forming the material into a coil around such plurality of stationary cutting edges with incoming successive layers being formed radially outwardly of the coil; and b. continuously cutting the inner layer of the elongated material into said number of shorter lengths.

19. A method for cutting elongated material as defined by claim 18 and wherein the steps of continuously guiding and forming the elongated material into a coil include the step of twisting the material as it becomes a layer of the coil.

20. A method for cutting filamentary tow material comprised of filaments having crimps therein, and comprising the steps of:
   a. continuously positioning material to be cut in successive layers, with the innermost layer being positioned against a plurality of stationary cutting edges and at least another layer being positioned against and outwardly laterally of the innermost layer;
   b. maintaining contact between the innermost layer and said cutting edges with no relative movement therebetween longitudinally of the filamentary material;
   c. tensioning the outermost successive layer of material to an extent sufficient so as to decrease the crimp in the filaments of the elongated material without permanently removing the crimp and moving the layers that are inwardly of the outermost layer toward the cutting edges to thereby relax the tension on the innermost layers of material so that the crimp in the filaments of the innermost layers recover to a desired predetermined extent; and
   d. continuously applying a force against the outermost successive layer and continuously changing the location of the application of force so that first the innermost layer is cut by one cutting edge and then is cut at a different location by the next cutting edge in the direction of the changing location of the application of force.

PO-1050
(5/69)

UNITED STATES PATENT OFFICE
CERTIFICATE OF CORRECTION

Patent No. 3,557,648          Dated January 26, 1971

Inventor(s) Arthur G. Coffin and Bruce W. Stockbridge

It is certified that error appears in the above-identified patent and that said Letters Patent are hereby corrected as shown below:

Column 1, line 72, after "device" omit --spool guide is mounted, and the--; line 73, before "is" omit --cutter assembly around which the tow--; after "is" insert --urged--.

Signed and sealed this 18th day of May 1971.

(SEAL)
Attest:

EDWARD M. FLETCHER, JR.
Attesting Officer

WILLIAM E. SCHUYLER, JR.
Commissioner of Patents